United States Patent

Pan et al.

[11] Patent Number: 5,015,548
[45] Date of Patent: May 14, 1991

[54] ERASABLE PHASE CHANGE OPTICAL RECORDING ELEMENTS AND METHODS

[75] Inventors: Kee-Chuan Pan, Pittsford; Yuan-sheng Tyan, Webster; Fridrich Vazan, Pittsford, all of N.Y.

[73] Assignee: Eastman Kodak Company, Rochester, N.Y.

[21] Appl. No.: 541,660

[22] Filed: Jun. 21, 1990

Related U.S. Application Data

[62] Division of Ser. No. 286,003, Dec. 19, 1988, abandoned.

[51] Int. Cl.$^5$ ............................................. G03C 1/00
[52] U.S. Cl. .................................. 430/19; 430/346; 430/290; 430/495; 430/945; 428/64; 346/135.1; 346/76 L
[58] Field of Search ............... 430/19, 495, 945, 270, 430/290, 346; 346/135.1, 76 L

[56] References Cited

U.S. PATENT DOCUMENTS

| 4,357,616 | 11/1982 | Terao et al. | 346/76 L |
| 4,670,345 | 6/1987 | Morimoto et al. | 346/76 L |
| 4,816,385 | 3/1989 | Gravesteijn et al. | 430/346 |

FOREIGN PATENT DOCUMENTS

| 60-34897 | 2/1985 | Japan | 430/19 |
| 61-89889 | 8/1986 | Japan | 430/19 |

Primary Examiner—Charles L. Bowers, Jr.
Assistant Examiner—Ashley I. Pezzner
Attorney, Agent, or Firm—J. Jeffrey Hawley

[57] ABSTRACT

An optical recording element comprising a thin film optical recording layer of an alloy is disclosed. The alloy is represented by the formula $Sb_xTe_{1-x}$, wherein x is between about 0.58 and 0.75. The alloys have short erasure times (amorphous to crystalline transition) and excellent environmental stability.

1 Claim, 1 Drawing Sheet

ERASABLE PHASE CHANGE OPTICAL RECORDING ELEMENTS AND METHODS

This is a divisional of application Ser. No. 286,003, filed Dec. 19, 1988, now abandoned.

FIELD OF THE INVENTION

This invention relates to antimony-tellurium alloys that are useful in optical recording.

BACKGROUND OF THE INVENTION

Optical recording, a technique utilizing a focused laser beam to make micron size marks in an appropriate medium for high density information recording, has been extensively studied in recent years. There are basically two types of optical recording; write-once and the erasable. In write-once recording, the media can only be recorded once, but the recorded information can be read many times. In erasable recording, the recorded information can be erased and new information can be recorded over the same are of the media.

There are several commercially available write-once optical recording products, but the introduction of erasable products has been plagued with delays. One of the major difficulties has been the availability of good media.

The technique most widely studied for erasable recording has been based on magneto-optic materials. This technique relies on the thermal-magnetic recording process. A focused laser beam is used to heat a spot on a magneto-optical material so that its coercivity is reduced and the magnetization within the spot can be switched by an applied field. The readout is accomplished by sensing the Kerr rotation of a reading laser beam induced by the magnetization in the media. Good recording performance has been reported by many working in the field. However, all reports are based on rare-earth/transition metal alloys, notably TbFeCo, and these alloys have some fundamental problems.

First of all, these materials are corrosion prone. Various approaches to solve the problem have been investigated, including the addition of a fourth element and the use of protecting layers on both sides of the alloy layer. The success of the first method is reducing the corrosion rate has been very limited; and it is also difficult to obtain defect free protecting layers to provide protection over the entire alloy layer. The compatibility of protecting layers with the alloy layers, in terms of adhesion, differential thermal expansion, etc., has been a problem also. Another problem with the alloy is that the properties critical to the optical recording process are extremely sensitive to the composition of the alloys. A few percent deviation from the optimum composition can degrade the performance significantly.

An alternative technique for erasable recording uses amorphous-crystalline phase-change materials. In this technique, a focused laser beam is used to switch the material between the amorphous state and the crystalline state. As is commonly done, a high power laser is used to heat a spot on the material to above its melting point to randomize the atomic arrangement in the material. When the laser beam is switched off, the material is left in the metastable amorphous state because of the high cooling rate. A low power laser, in many cases of longer duration, is then used to heat the material to below the melting point. The increased mobility of the atoms at the elevated temperature then allows the material to go to the more stable crystalline state. Thus by varying the power and duration of the laser beam, the material can be switched between the amorphous state and the crystalline state, and erasable recording is thus accomplished.

The major problem in the development of this technique has been the lack of appropriate materials. In particular, it has been difficult to find materials which have crystallization rate high enough under laser heating to alloy high rate recording (erasure time $<1$ $\mu$s), and yet slow enough at room temperature to ensure data integrity.

With slower erasing materials, the erase beam spot is normally made elliptical. This means that two lasers are needed in the recorder head. With faster erasing materials, only one laser, providing a circular spot, is needed in the recording head. The simplicity and cost advantage of a one-laser head over a two-laser head is apparent. Also, lower power laser pulse means lower laser cost and shorter laser pluse means higher data rate. In addition, low power laser pulse is less likely to damage the substrate. It is evident from the above discussions that super-sensitive media will offer many advantages.

EP-A1-0-212-336 describes a method of erasable recording using single-phase phase-change alloys. Whereas the crystallization rate of the preferred material, $(GeTe)_{85}Sn_{15}$, appeared to be high (erasure time $<55$ ns), the laser power required for write and erase was also high (18 mW and 10 mW, respectively). While there was no mention of the corrosion resistance of the material, it contains a high concentration of corrosion prone tellurium.

Shogo Yagi, et al (Crystallization of Amorphous Marks in SbTe Erasable Optical Storage Media, Japanese Journal of Applied Physics, Vol 26, Supplement 26-4, 51(1987)), studied $Sb_xTe_{1-x}$ erasable optical storage alloy. The composition range they reported were from $x=0.19$ to $0.55$. They found that $Sb_2Te_3$ thin film was the best composition due to its long amorphous life time at room temperature and short erasure time ($\sim 1$ $\mu$s).

Yagi's data indicate that when Sb content is higher than 55% the amorphizing threshold increases abruptly (FIG. 4 in Yagi's paper), and when Sb content is more than 44% the erasure time shows a trend of rapid increase (FIG. 8 is Yagi's paper).

The problem with the compositions of Yagi et al is that the time required for erasure are longer than desired and that the environmental stability of the composition is less than desired. The present invention is directed to a solution to these problems.

SUMMARY OF THE INVENTION

In accordance with the present invention, there is provided an optical recording element comprising a thin film optical recording layer of an alloy, said alloy represented by the formula $Sb_xTe_{1-x}$, wherein x is between about 0.58 and 0.75.

In preferred embodiments, x is betweeen about 0.65 and 0.73.

DETAILED DESCRIPTION OF THE INVENTION

Figure 1:
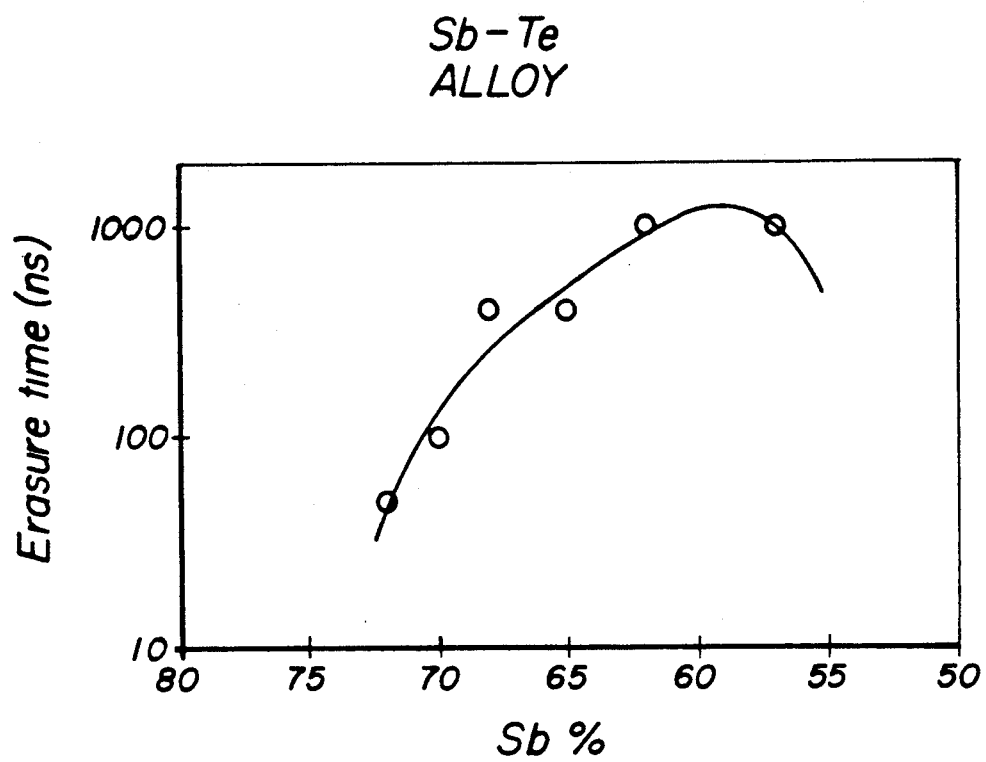
FIG. 1 is a plot of the erasure time versus alloy composition for several alloys useful in the invention.

The alloy that is useful in the present invention is similar to the $Sb_xTe_{1-x}$ alloy of Yagi et al. To our surprise however, we found that the films with composition near $Sb_{70}Te_{30}$ performed exceptionally well as optical recording media. The films have a much shorter erasure time ($\sim 100$ ns), and a better environmental stability than that of $Sb_2Te_3$ studied by Yagi et al. The content of corrosion prone tellurium is also considerably less, which leads to improved corrosion resistance.

The alloys useful in the invention have fast write-erase rates, improved sensitivity, thermal stability, and corrosion resistance. At $Sb_{70}Te_{30}$ composition, the medium can be cycled at $<100$ ns and $<12$ mW.

The media can be prepared by conventional vacuum deposition processes, such as evaporation and sputtering, onto a variety of substrates. The layer thickness is preferably between 10 and 300 nm. An overcoat layer is preferably applied over the alloy layer to reduce any alloy deformation as a result of the recording processes. Such deformation can result in residual signals that can not be erased by the erasing process. Common overcoat materials are polymer coatings such as those described in U.S. Pat. No. 4,340,655 issued Jul. 20, 1982 to Hollister et al and dielectric coatings such as $SiO_x$, ZnS and $Al_2O_3$. A commercially available acrylic spray paint such as clear Krylon ® can be used.

After the alloy is deposited, the recording layer is preferably initialized. The layer that is deposited by vacuum deposition is amorphous. For optimum performance, it is desirable to crystallize at least those portions of the layer that are to be used for recording. The layer can be crystallized by heating, for example in an oven or by other conventional means such as with a laser or a high power flash lamp.

Optical recording layers can be prepared by conventional thin film deposition techniques such as RF (radio frequency) and DC (direct current) sputtering from an alloy target using the alloys of the invention. Enhancement of sputtering processes by applying magnetic fields (magnetron sputtering) can also be used.

Supports which can be used include plastic plates, such as polyethylene terephthalate, polymethyl methacrylate, and polycarbonate, a glass plate, paper and metallic plates such as aluminum.

Erasable recording is achieved by varying the power of the laser pulses. A high power, short duration (e.g. 100 ns, 12 mW) pulse changes the material to a low reflectivity amorphous state and a low power long duration (e.g., 100 ns, 6 mW) pulse changes the material to a high reflectivity crystalline state.

Thus, according to another aspect of the invention, there is provided a method of recording and erasing information on an optical recording element, said element comprising a thin film optical recording layer of an alloy in a crystalline form, said alloy represented by the formula $Sb_xTe_{1-x}$, wherein x is between about 0.58 and 0.75, said method comprising the steps of:

(a) recording said information by focusing an information modulated laser beam on said crystalline alloy recording layer at a power and for a time sufficient to form a pattern of amorphous area in said layer of alloy, said pattern corresponding to said information, and (b) focusing a laser beam on said recorded layer for a time and at a power sufficient to crystalline at least a portion of the amorphous area formed in step (a), thereby erasing the information in the amorphous areas.

A useful recording material comprises, starting from the outside surface of the recording material, an overcoat layer, a thin film optical recording layer as described and a substrate. In response to a drive signal, the intensity of a diode recording beam focused on the recording layer is modulated in accordance with information to be recorded.

During recording, the recording material is spun at a constant rate, e.g., 1800 rotations per minute (rpm). As a result, a track of information is recorded on the optical recording layer in the form of selected amorphized areas. As recording continues, the recording spot is caused to scan radially inward across the recording material, thereby causing information to be recorded along a spiral or concentric track. The sizes and spacings of the recorded information marks vary in accordance with the information content of the recording laser drive signal, as well as with radial position on the recording material.

During the readback process, the thus recorded information bearing recording material is spun at the same rate as it was spun during the recording process. The optical path of a readout laser beam is focues to a playback spot on the recording material by a high numerical aperture lens. The recording material is of the reflective type so that the radiation forming the playback spot is reflected back through the high numerical aperture lens after interacting with the information marks recorded on the optical recording material. A lens directs reflected laser radiation onto a detector which produces an electrical playback signal in response to temporal variations (contrast) in the irradiance of the reflected laser radiation falling on the detector.

Other types of recording materials are also useful. For example, a reflective substrate such as aluminum can be provided with a recording layer comprising an alloy of the invention on both sides of the substrate. A useful recording material is thus, aluminum coated on both sides with a smoothing layer, a layer of the phase change alloy of the invention and a layer of a clear protective overcoat. In a similar embodiment, the alloy is provided on a clear substrate which is then adhered to both sides of the substrate with an adhesive. In yet another embodiment, the alloy as described is provided on a transparent substrate to form the recording layer. The optical recording layer is then adhered to the recording layer of an identical recording material with an adhesive layer. The thickness of the adhesive layer provides for the optical separation of the two recording layers.

The following examples are presented for a further understanding of the invention.

EXAMPLE 1

A range of $Sb_xTe_{1-x}$ composition, $0.58 \lesssim x \lesssim 0.75$, were investigated. The deposited alloys were overcoated with a clear acrylic spray paint. Some areas of the as-deposited amorphous films were initially irradiated by laser pulses at 30 μs, 2 mW. The irradiated spots were therefore crystallized. The center of the crystallized spots were followed by laser irradiation at 50 ns, 12 mW in order for them to be re-amorphized.

The alloys were then subjected to a variety of conditions to recrystallize designated areas. The areas were subjected to a laser pulse irradiation (power $\lesssim 12$ mW).

The shortest required pulse lengths (erasure time) to erase several compositions are shown in FIG. 1. The erasure time of the present alloy is generally less than 1 μs.

The above amorphous films with laser crystallized spots were kept in a humidity chamber at 70° C. and 70% relative humidity for 3 weeks. No corrosion or crystal growth was observed. This test shows that these films are thermally and environmentally stable.

EXAMPLE 2

We also investigated the compositional dependence of erasure time for thermally crystallized films. The method was the same as in Example 1, except that the first laser crystallization step was not needed. The results were similar to those in Example 1.

Example 3

The phase transformation kinetics (PTK) diagrams were constructed for a number of compositions according to the method of Chen et al, Appl. Phys. Lett. 46, 734 (1985). Amorphous $Sb_{70}Te_{30}$, thermally crystallized $Sb_{70}Te_{30}$, amorphous $Sb_{72}Te_{28}$, and amorphous $Sb_{63}Te_{37}$, were tested.

The amorphized region, for as-deposited film, was determined by firstly laster crystallizing (30 μs, 2 mW) some spots and re-amorphizing them at proper laser poser-pulse duration combinations.

The amorphized region, for thermally pre-crystallized film, was determined by laser amorphizing some spots with proper laser power-pulse duration combinations.

The crystallized region, for as-deposited film, was determined by laser crystallization (30 μs, 2 mW) followed by re-amorphization (50 ns, 12 mW), and then re-crystallizing them at proper power-pulse duration combinations.

The crystallized region, for thermally pre-crystallized film, was determined by laser crystallizing the laser-amorphized spots with proper power-pulse duration combinations.

The amorphized and crystallized regions in the PTK diagrams indicate that the $Sb_{70}Te_{30}$ alloys can be amorphized at 10 ns, >100 mW and crystallized at 100 ns, 6–9 mW.

EXAMPLE 4

Films with various compositions were used to write (100 ns, 12 nW) and erase (100 ns, 6 mW) for 1000 cycles. As-deposited and thermally crystallized films were tested. The reflectivity difference (~6%) between write state and erase state does not show any sign of degradation after 1000 cycles. This indicates that these films are good erasable materials.

The invention has been described in detail with particular reference to preferred embodiments thereof, but it will be understood that variations and modifications can be effected within the spirit and scope of the invention.

We claim:

1. A method of recording and erasing information on an optical recording element, said element comprising a thin film optical recording layer of an alloy in a crystalline form, said alloy represented by the formula $Sb_xTe_{1-x}$, wherein x is between about 0.58 and 0.75, said method comprising the steps of:
   (a) recording said information by focusing an information modulated laser beam on said cystalline alloy recording layer at a power and for a time sufficient to form a pattern of amorphous areas in said layer of alloy, said pattern corresponding to said information, and
   (b) focusing a laser beam on said recorded layer for a time and at a power sufficient to crystallize at least a portion of the amorphous areas formed in step a), thereby erasing the information in said amorphous areas.

* * * * *